Patented Feb. 7, 1933

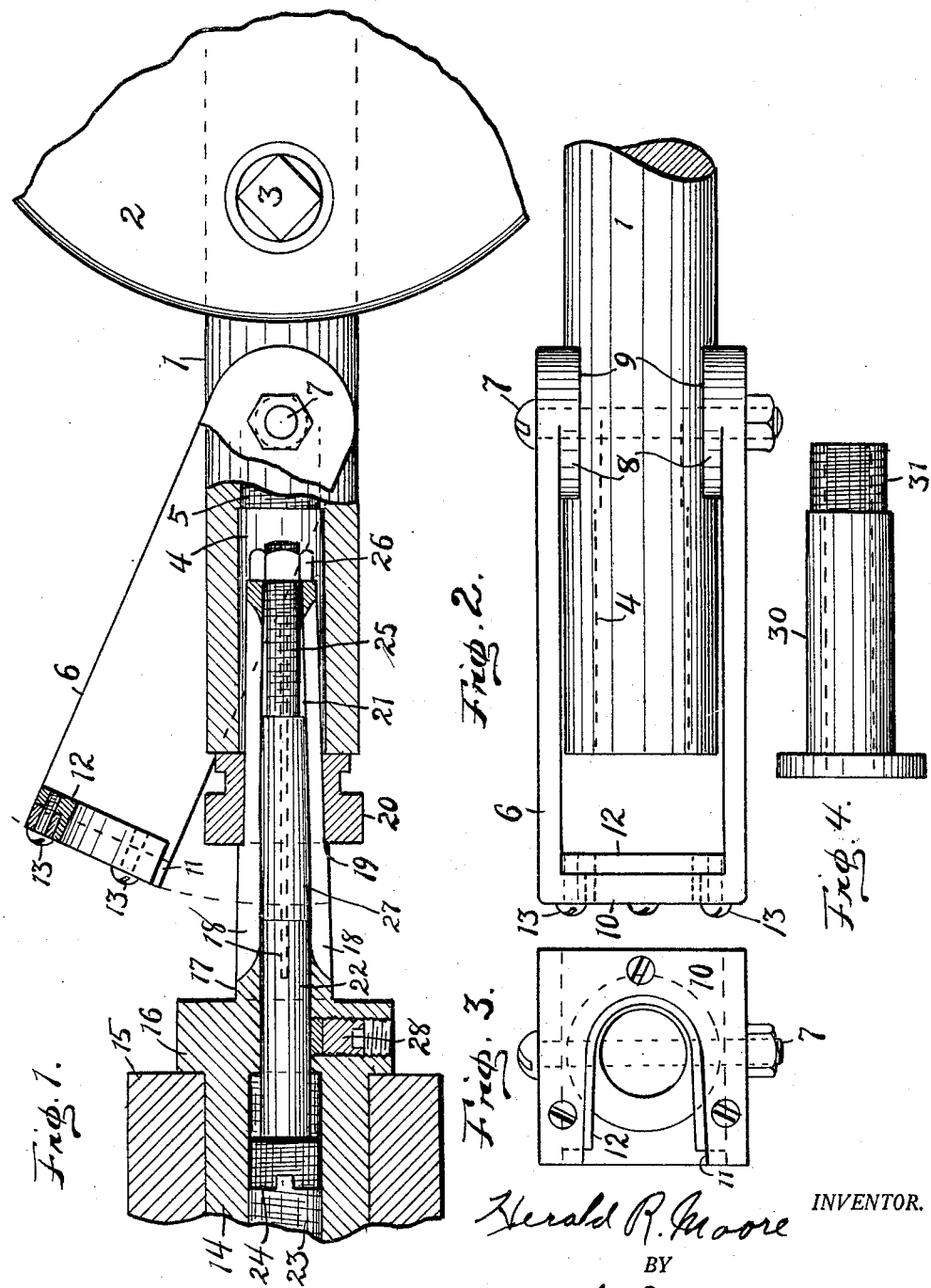

1,896,366

UNITED STATES PATENT OFFICE

HERALD R. MOORE, OF FORT WAYNE, INDIANA

PIECE PLACER AND PULLER ATTACHMENT FOR LATHES

Application filed August 27, 1930. Serial No. 478,097.

This invention relates to improvements in piece placer and puller attachments for latches, and the object thereof is to provide means for mounting a piece of work in precise position in a lathe to be dressed therein and by which said piece after being dressed may be quickly removed and replaced by another similar piece so as to facilitate rapid manufacture thereof.

An illustrative embodiment of the invention is shown in the accompanying drawing, in which:—

Fig. 1 is a plan view of a structure embodying the invention applied to a turret lathe, portions being broken away and in section;

Fig. 2 is a side elevation of the piece placer and puller, a portion being broken away;

Fig. 3 is an end elevation projected from Fig. 2; and

Fig. 4 is a side elevation of an adapter attachable to the appliance for use in handling undersized work pieces.

The structure shown in the drawing consists of a stub-shaft 1 adapted to be secured in operating position in a turret 2 so as to be held in alinement with the axis of the lathe, the shaft being secured in the turret in any suitable manner such as by a screw 3. The outer end of the sub-shaft 1 has an axial bore 4, the inner end of which is threaded as indicated by 5.

Upon the stub-shaft is secured a yoke 6 by means of a bolt 7, which passes transversely through the shaft, the respective ends of the bolt extending through the corresponding ends of the yoke. Preferably, each end of the yoke has a circular lug 8 that extends from its inner face into a recess 9 made in the stub-shaft in which the lug turns when the yoke is swung upon the bolt 7. The front end 10 of the yoke has a slot 11 that opens through one side therein and has a slotted plate 12 secured upon its inner face by means of screws 13.

A mandrel 14 is secured in the collet 15 of the lathe in the usual manner and is provided with an annular shoulder 16 that bears against the corresponding face of the collet so as to limit inward movement of the mandrel with respect to the collet. The mandrel has a forwardly extending spindle 17 provided with a series of slots 18 that extend partway throughout its length, and said spindle has a shoulder that constitute a stop 19 against which a workpiece 20 is positioned when placed thereon. The forward portion of the spindle particularly from the shoulder 19 to its forward end is tapered, and the bore 21 of said spindle is also tapered, approximately throughout the length of the slots 18 therein.

An adjusting bolt 22 is positioned in the bore 23 of the mandrel and extends through the bore 21 of the spindle. The head 24 has threaded relation with the mandrel in the threaded bore thereof, and the opposite end of the bolt has a straight threaded portion 25 that projects beyond the end of the spindle and has a nut 26 thereon. Also, the middle portion 27 of the bolt is tapered and fits the taper bore 21 of the spindle so that upon longitudinal adjustment of the bolt toward the outer end of the spindle causes radial expansion of the slotted portion of the spindle. In this manner the circumference of that portion of the spindle adjacent the stop 19 may be adjustably varied so as to accommodate the work-piece 20 when positioned thereon. This adjustment is made so that the work-piece 20, when forcibly pressed lengthwise upon the spindle up against the shoulder 19, will be held firmly in frictional contact with the spindle whereby the work-piece is caused to revolve as the spindle rotates. The bolt 27 is held in adjusted portions by means of a set-screw 28 which is disposed in the mandrel, and by the nut 26 on the threaded end of the bolt which bears against the corresponding end of the spindle.

In operation, the turret 2 is moved back until the stub-shaft 1 is spaced a sufficient distance from the spindle to permit placing of the work-piece 20 onto the end of the spindle, and subsequently the turret is moved toward the collet in the head-stock of the lathe. During this operation the work-piece is engaged by the outer end of the stub-shaft and moved forcibly onto the spindle against the stop 19. The turret is then backed away to its former position and the work-piece is dressed in the usual manner by applying one or more tools thereto. After the dressing operation is completed the turret is again moved toward the collet and the yoke is then swung upon the bolt 7 so as to bring the plate into position between the work-piece and the shoulder 16 and astride of the spindle. While the yoke is thus positioned, the turret is again backed off so that the work-piece on the spindle becomes engaged by the slotted plate 12 in the yoke and is forcibly withdrawn from the spindle. The work-piece is then replaced in like manner upon the spindle by another similar work-piece and dressed as in the first instance.

The bore 4 of the stub-shaft is of such diameter as to permit free movement of the stub-shaft over the spindle and is threaded as indicated by 5 so that an adapter consisting of a sleeve 30 having a threaded end 31 may be positioned in the hollow stub-shaft and applied to a comparatively smaller work-piece. Also, the slotted plate 12 may be replaced in the yoke by a similar plate slotted to suit the particular size of the work-piece. Also, spindles of various sizes may be made to suit the requirements of the work-pieces to be dressed.

A particular advantage of the invention is that the work-pieces may be positioned upon and removed from the spindle during rotation of the spindle without interrupting the rotary action thereof, and thus both time and effort are conserved, and also a further advantage is realized in that many work-pieces of similar dimensions may be accurately placed in position for dressing so that uniformity in the dressing operations is facilitated.

I claim:

1. In an appliance of the class described, a rotatably mounted hollow spindle provided with a series of longitudinally disposed slots, the slotted portion of said spindle being tapered internally and externally, a shoulder on the exterior of the spindle constituting a stop, a bolt adjustably positioned having a tapered portion extending into said spindle adapted to expand said spindle, a stub-shaft mounted so as to have longitudinal movement one end of which has a bore for the reception of one end of the spindle, a yoke, the arms of which are pivotally connected with said shaft and the forward end of which is slotted so as to straddle said spindle, and means for actuating said shaft.

2. An appliance of the class described comprised of a stub-shaft one end of which is bored to receive a spindle, and a yoke, the arms of which are pivoted to the shaft, the outer end of said yoke being slotted so as to straddle said spindle, when said spindle is received in said shaft, at a point spaced from the corresponding end of said shaft.

3. An appliance of the class described comprising a hollow stub-shaft adapted to receive a spindle in its bore, and a member pivoted on said shaft having a portion extending beyond one end of said shaft adapted to engage a work-piece located on said spindle when said spindle is received in said shaft so that upon withdrawal of said shaft from said spindle said work-piece is removed therefrom.

4. In an appliance of the class described, a rotatably mounted hollow spindle provided with an external shoulder, a portion of said spindle having longitudinal slots made therein, the ends of which slots terminate at points spaced from the corresponding ends of the spindle and oppositely with respect to said shoulder, a bolt adjustably positioned having a tapered portion projected into the slotted portion of the spindle adapted to expand same, a hollow stub-shaft mounted so as to have longitudinal movement adapted to receive one end of the spindle in its bore, a yoke pivoted on said stub-shaft the outer end of which yoke is slotted and adapted to straddle the spindle at a point thereon beyond said shoulder when said spindle extends into said stub-shaft, and means for actuating said stub-shaft.

In testimony whereof I affix my signature.

HERALD R. MOORE.